United States Patent
Mao et al.

(10) Patent No.: US 8,719,421 B2
(45) Date of Patent: May 6, 2014

(54) CROSS DOMAIN INTERACTION OF A WEB APPLICATION

(75) Inventors: Xinshen Mao, Beijing (CN); Li Yi, Beijing (CN); Ke Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 12/490,577

(22) Filed: Jun. 24, 2009

(65) Prior Publication Data

US 2009/0327421 A1 Dec. 31, 2009

(30) Foreign Application Priority Data

Jun. 25, 2008 (CN) .......................... 2008 1 0124981

(51) Int. Cl.
*G06F 15/16* (2006.01)
*G06F 17/00* (2006.01)
*G06F 3/00* (2006.01)
*G06F 9/46* (2006.01)

(52) U.S. Cl.
USPC ........... 709/227; 709/245; 709/219; 715/240; 715/748; 719/329

(58) Field of Classification Search
USPC ......... 709/225, 213–216, 217–219, 227, 237, 709/245; 719/328, 313, 329; 715/221–226, 715/240, 749, 808, 825, 748
See application file for complete search history.

(56) References Cited

U.S. PATENT DOCUMENTS

| | | | |
|---|---|---|---|
| 7,246,126 B2 * | 7/2007 | Inami et al. .......................... 1/1 |
| 7,328,435 B2 * | 2/2008 | Trifon ............................ 717/171 |
| 7,490,141 B1 * | 2/2009 | Cammarata et al. .......... 709/219 |
| 7,506,248 B2 * | 3/2009 | Xu et al. ......................... 715/240 |
| 7,809,785 B2 * | 10/2010 | Appleton et al. ............. 709/201 |
| 7,979,791 B2 * | 7/2011 | Yang et al. ..................... 715/234 |
| 8,065,610 B2 * | 11/2011 | Xu et al. ......................... 715/240 |
| 8,131,591 B2 * | 3/2012 | Gorty et al. ................... 705/14.4 |
| 8,209,706 B2 * | 6/2012 | Corvera et al. ............... 719/315 |
| 2006/0010134 A1 * | 1/2006 | Davis et al. ..................... 707/10 |
| 2007/0256003 A1 * | 11/2007 | Wagoner et al. ............ 715/501.1 |
| 2007/0299735 A1 * | 12/2007 | Mangalick et al. ............. 705/26 |
| 2007/0299857 A1 * | 12/2007 | Gwozdz et al. ............... 707/102 |
| 2007/0300064 A1 * | 12/2007 | Isaacs et al. .................. 713/168 |
| 2008/0313648 A1 * | 12/2008 | Wang et al. .................... 719/315 |

(Continued)

OTHER PUBLICATIONS

Mahemoff, Michael, Software As She's Developed, http://softwareas.com/cross-domain-communication-with-iframes, "Cross-Domain Communication with IFrames", Mar. 31, 2008, p. 1-8.*

(Continued)

*Primary Examiner* — Gregory Todd
(74) *Attorney, Agent, or Firm* — Jeffrey T. Holman (57) ABSTRACT

A method and system for cross domain interaction of a Web application are proposed, wherein a Web application belonging to a first domain needs to interact with a service belonging to a second domain. The method comprises: by the Web application, creating an iFrame in a webpage, wherein the iFrame is belonging to the first domain; creating a form in the iFrame; submitting the form to a Web server providing a service belonging to the second domain; and refreshing the iFrame by receiving a response from the Web server, changing the domain, to which the iFrame is belonging, to the second domain, and performing cross domain interaction with the service belonging to the second domain with the information contained in the form.

15 Claims, 9 Drawing Sheets

(56) References Cited

U.S. PATENT DOCUMENTS

| | | | |
|---|---|---|---|
| 2009/0037517 A1* | 2/2009 | Frei | 709/202 |
| 2009/0070190 A1* | 3/2009 | Gorty et al. | 705/10 |
| 2009/0271690 A1* | 10/2009 | Iglesias | 715/200 |
| 2009/0276835 A1* | 11/2009 | Jackson et al. | 726/4 |
| 2009/0327421 A1* | 12/2009 | Fu et al. | 709/204 |

OTHER PUBLICATIONS

Freitag, Pete, "AJAX on IE—back to the IFRAME", http://www.petefreitag.com/item/446.cfm (Sep. 5, 2008).

\* cited by examiner

```
                                                            ┌610
┌─────────────────────────────────────────┐
│ Browser - Shopping Application          │
│ http://sample_shop.com                  │
│─────────────────────────────────────────│
│ Payee account     [1111111111111111]─611│
│ Amount            [$100.00]────────612  │
│ Payment serial number [200805280001]─613│
│─────────────────────────────────────────│
│ Payer account     [2222222222222]──614  │
│                        [ Pay ]─616      │
└─────────────────────────────────────────┘
```

CROSS DOMAIN INTERACTION OF A WEB APPLICATION

TECHNICAL FIELD

Embodiments of the invention generally relates to the field of Web application, and particularly relates to the cross domain interaction of a Web application.

BACKGROUND

A Web application is a Web-based application, which means any application program for which the user interface resides in a Web browser. It is a collection of some webpages and other resources for completing some tasks. A Web application is a product of typical client/server architecture. It enables clients and servers to communicate over network. The common message board, chat room, and bulletin board system (BBS) are all examples of Web applications. These applications, however, are relatively simple. The real core of Web applications is to handle data.

Figure 1A:
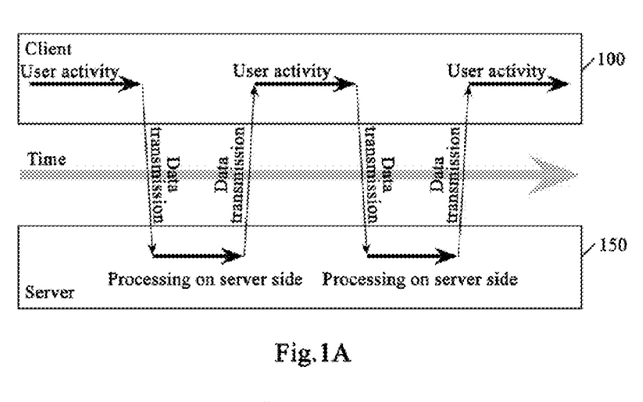
FIG. 1A illustrates a model of a traditional Web application.

Referring to FIG. 1A, a model of a traditional Web application is shown. In a typical Web application, a user activity in the user interface (UI) in a browser of a client 100 can trigger a request, and the request is sent to a Web server 150. The server 150 performs some processing, such as retrieving data, handling data, interacting with various legacy systems, after receiving the request. Then the server 150 returns a page to the client 100 as a response. The client 100 may continue to perform the next user activity after receiving the response, thereby repeating the interaction process with the server 150. Such process is known as synchronous, i.e., the server 150 enforces the user to enter a submit-wait-redisplay process, making user activities synchronous with the processing time of the server 150. It can be seen from the time axis that the interaction process is sequential and always kept synchronous with the time axis. In FIG. 1A, the process of sending a request to the server 150 and returning a response by the server 150 is generally called as data transmission.

Figure 1B:
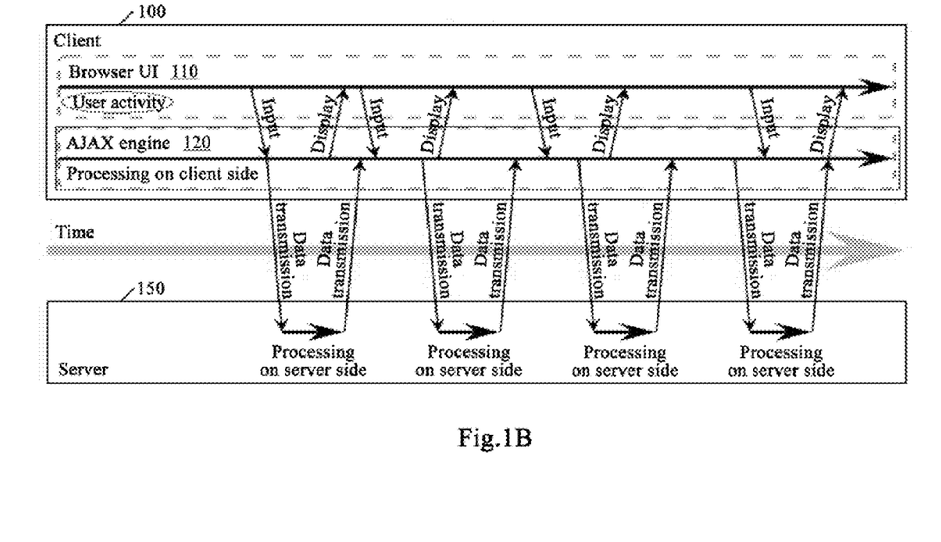
FIG. 1B illustrates a model of a rich Web application using AJAX.

Referring to FIG. 1B, a model of a rich Web application using AJAX is shown. A rich Web application running on a client 100 communicates with a server 150 asynchronously by using the AJAX technique, without refreshing the entire page. The term AJAX is a shortening of "Asynchronous JavaScript And XML", which is combined by some new technologies in a new manner. AJAX contains:

XHTML and CSS standard based presentation;
Document Object Model for dynamic display and interaction;
XMLHttpRequest for asynchronous communication with server;
JavaScript for binding everything.

A Web application, which is dynamic and responds quickly, may be constructed with AJAX, so that the browser can provide users with more natural browsing experience. AJAX provides the ability of asynchronous communication with the server 150 so as to free users from the cycle of traditional request/response. With AJAX, the client 100 may perform processing on the client side through an AJAX engine 120 when a user activity (e.g. submitting a request, inputting) occurs in the user interface (UI) 110 of the browser, and update and display the UI of the browser right after the processing on the client side is completed. Meanwhile, the AJAX engine 120 makes an asynchronous request to the server 150 to perform the processing on the server side. When the response corresponding to the request is returned from the server 150, the client 100 can update the UI 110 accordingly through the AJAX engine 120 without refreshing the entire page. It is most important that users are even not aware of the browser on the client 100 being communicating with the server 150, so that the Web site looks like making an instant response. Therefore, the Web application can present the alteration to users without fully depending on reloading the page from the server. In the FIG. 1B, the process of sending a request to the server 150 and returning a response by the server 150 is generally called as data transmission.

Traditionally, since the browser of the client will refresh the entire page, a large amount of data is to be transmitted because the entire page must be sent again. If AJAX is used, the server may return a shorter message comprising some certain information instead of the entire page, and only a related part of the browser page, instead of the whole screen, is to be refreshed.

The core of AJAX is a JavaScript object XmlHttpRequest. It is a technique supporting asynchronous request. In brief, the object XmlHttpRequest allows client-side JavaScript to make an HTTP request to the server (which can be performed with the method GET or POST, but not limited to such two methods, for example, Head/PUT/DELETE) and process the response, without refreshing the page in the browser and without blocking the user. The detailed definition and description of the object XmlHttpRequest may be referred to the specification of W3C (World Wide Web Consortium) (http://www.w3.org/TR/XMLHttpRequest). The object XmlHttpRequest can be further used for requesting or sending any kind of data, more than just XML data.

In consideration of security, an AJAX-based rich Web application can only make access to resources in the current domain where the application locates, and cannot implement cross domain access. For example, AJAX in the site domain1.com can only make access to resources within this site, and cannot make cross domain access to resources in the site domain2.com. However, a Web application belonging to one certain domain sometimes wants to make an AJAX request to a server belonging to the other domain in order to invoke services or resources in the server. For example, a Web application wants to utilize external REST (Representational State Transfer) services, such as "Google suggest", "Yahoo! Spell checking", etc.; a Web application wants to utilize some remote corporate REST service available on the Intranet; a Web application wants to include news FEEDs from an external server (such as CNN); and a Web application wants to create a Mashup (a novel API integration application).

The above-mentioned cross domain access is restricted by the existing XmlHttpRequest implementations. Per default, requests are only allowed to be submitted to the server in the current domain where the application locates. This may prevent malicious AJAX codes served from one site from taking the user browser as a basis for attacking another site and may prevent critical information (such as usernames, passwords) on one site from revealing. Furthermore, this accords with the same-origin policy which is part of the JavaScript security model.

A rich Web application often needs to interact with a service from other domain. Especially in an SOA or Mashup environment, a rich Web application often needs to interact with multiple services from other domains, so that the ability of cross domain interaction becomes more important. But based on the above restrictions, a rich Web application is not allowed to interact with the services provided by other domains outside the domain where the application locates.

SUMMARY

In an embodiment of the present invention, an iFrame is created by a Web application, and the service invocation context and/or data access context is sent to another different domain by the iFrame through a form using GET or POST (but not limited to such two methods, e.g. Head/PUT/DELETE). A response from said another domain may switch the iFrame to said another domain, so that it is possible to invoke the services of the domain or access the data of the domain. Then the service invocation result and/or data access result is sent to the original domain by the iFrame through a form using GET or POST. A response from said original domain may switch the iFrame back to said original domain, so that it is possible to process the result.

According to an embodiment of the present invention, there is proposed a method for cross domain interaction of a Web application, wherein a Web application belonging to a first domain needs to interact with a service belonging to a second domain, wherein the Web application, creates an iFrame in a webpage, wherein the iFrame is belonging to the first domain, a form is created in the iFrame, the form is submitted to a Web server providing a service belonging to the second domain; and the iFrame is refreshed by receiving a response from the Web server, changing the domain, to which the iFrame is belonging, to the second domain, and performing cross domain interaction with the service belonging to the second domain with the information contained in the form. Furthermore, the method can determine whether the method GET or POST is utilized to submit the form according to the size of data amount in the form, wherein when the data amount in the form is small, the method GET is utilized, and when the data amount in the form is large, the method POST is utilized.

BRIEF DESCRIPTION OF THE DRAWINGS

The invention may best be understood by referring to the following description and accompanying drawing that are used to illustrate embodiments of the invention. In the drawings.

It is noted that the same or similar labels designate the same or similar elements or components throughout the figures.

DETAILED DESCRIPTION OF EMBODIMENTS

The exemplary embodiments of the invention will be described below in conjunction with the accompanying figures. For clarity and simplicity, not all features of the actual implementation are described in the specification. However, it should be appreciated that many implementation-specific decisions must be made in the procedure of developing any of such actual embodiments in order to realize the particular objectives of developers, for example complying with those limiting conditions in related to systems and businesses, wherein the limiting conditions may be varied depending on the implementation. Further, it should be appreciated that although the development effort may be complicated and time-consuming, such development effort is only a routine task for those skilled in the art that benefit from this disclosure.

Moreover, it is further noted that, in order not to obscure the invention by those unnecessary details, only the apparatus structures and/or processing steps in related to the scheme according to embodiments of the invention are shown in the accompanying figures, while other details not relative to the invention are omitted.

Figure 2:
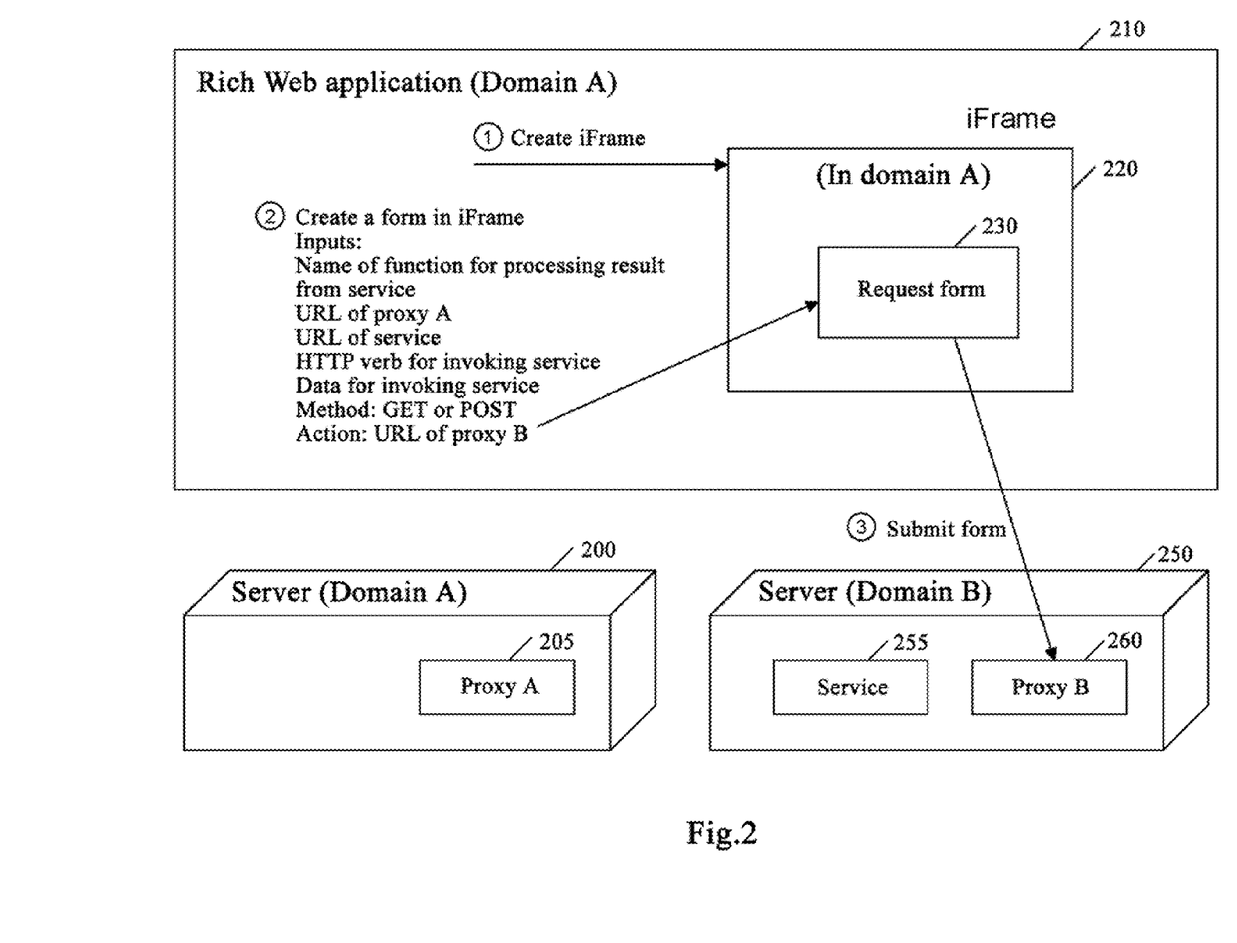
FIG. 2 illustrates an exemplary diagram of a system for cross domain interaction of a Web application and its working flow according to one embodiment of the present invention.

The detailed descriptions of the present invention and its embodiments are proposed as below. Firstly referring to FIG. 2, FIG. 2 illustrates an exemplary diagram of a system for cross domain interaction of a Web application and its working flow according to one embodiment of the present invention. As shown in FIG. 2, the system comprises a server 200 and a server 250, wherein the server 200 provides services and/or data belonging to a domain A, and the server 250 provides services and/or data belonging to a domain B. The server 200 has a proxy A 205 as an intermediate, for passing the related application service request or response to the server 200. The server 250 has a proxy B 260 as an intermediate, for passing the related application service request or response to the server 250. It is noted that the proxy A 205 and the proxy B 260 are suitable for more general architecture for client/server. In an alternative embodiment of the present invention, the above proxies can be omitted. Instead, the server 200 and the server 250 directly process external data or requests. In this embodiment of the present invention, the server 200 and the server 250 can be either two entities physically independent, or two Web servers logically independent. Both provide service/data belonging to different domains, respectively.

When a user wants to access the domain A, a rich Web application 210 belonging to the domain A will be invoked and running on the client browser. The rich Web application 210 and the server 200 can communicate with each other, as they are belonging to the same domain. In an embodiment of the present invention, in some case, the rich Web application 210 wants to make a cross domain invocation to a service 255 belonging to the domain B on the server 250. At Step 1, the rich Web application 210 first creates an iFrame object, for example an iFrame 220 as shown in FIG. 2. At this point, the domain where the iFrame 220 locates is the domain A.

An iFrame object, which can also be called as an embedded element or an embedded frame, can embed frames and contents of a webpage into an existing HTML webpage, as a sub-window of the existing HTML webpage. An iFrame can be embedded into any part of an HTML webpage. One of its main characteristics is that the HTML file referenced by the iFrame is not displayed independent of the other HTML file, but may be directly embedded into one HTML file. The two HTML files, however, are independent of each other. One file is not treated as a part of the other, but each file is treated as a whole file. Moreover, an iFrame can display the same content in different pages repeatedly, without rewriting the content. Through the object model in the page where the iFrame object locates, the attributes, not the content, of the iFrame object can be access, thereby ensuring the security. According to the embodiment of the invention, the created iFrame is used for enabling cross domain interaction of a Web application. The size of an iFrame can be adjusted. In the embodiment of the invention, the iFrame may be invisible so that users even cannot see it in the UI.

Returning to FIG. 2, at Step 2, the rich Web application 210 creates a request form 230 in the iFrame 220. The rich Web application 210 populates the created request form 230 with the request data for interaction. The inputs of the request form 230 may comprise: name of the function for processing the result from the service 255; URL of the proxy A; URL of the service 255; HTTP verb for invoking the service 255; and data for invoking the service 255. The methods of the request form 230 may comprise GET or POST. The actions of the request form 230 may comprise the URL of the proxy 260. It is noted that, in the present context, the contents contained in the request form and the result form to be described in the following are used as examples only. It can be understood by the skilled in the art that the contents in the forms can be altered based on different particular implementations and user requirements, without departing from the scope of the present invention. For example, the request form may comprise the context related to service invocation or data access, and the result form may comprise the result related to service invocation or data access.

Herein, a form is used as a data container so that the submitted request or service result can be filled in the form and transmitted through the form. The reason using forms is that different sizes of data can be transmitted through a form. Since the method GET or POST can be comprised in the form, and the two methods represent different manners of form submission, both a small amount of data and a large amount of data can be transmitted. Several differentiations between GET and POST are described as below. GET adds a parameter data queue into an URL pointed by the Action attribute of the submitted form, wherein the values and fields in the form have one-to-one correspondence and can be seen in the URL. POST places various fields and their contents into the HTML header and transmits them together to the URL address pointed by the Action attribute through the HTTP POST mechanism. Users cannot see such process. Since the method GET encodes data into the URL, the amount of data to be transmitted is restricted by the URL length so that it is suitable for transmitting smaller data. The amount of data to be transmitted by the method POST has no restriction.

If a form or data in a browser will be transmitted to the server side, the method GET is convenient and intuitive, but the disadvantage is that a user accessing the website may also send the URL string to the server after modifying it. It is error-prone if the URL string is not well processed. Moreover, the method GET may generate a very long URL, which may exceed the restriction on URL length defined by some browsers and servers. The length of the character string passed by GET cannot exceed 250 characters. If the length exceeds, the browser may truncate the URL automatically, resulting in data miss. Further, except ASCII characters, the method GET does not support any other characters. If the string contains Chinese characters or other non-ASCII characters, an additional encoding processing is needed.

When sending data by the method POST, it is not transparent to users. According to the HTTP protocol, the data is appended to the HTTP header and cannot be modified by users as they want. This is more secure for a Web application. Moreover, a large amount of data can be sent to the Web server by POST. Therefore in the embodiment of the present invention, the Web application may intelligently select the method GET or POST to submit form data, according to the size of data being transmitted actually.

Returning to FIG. 2, after the iFrame 220 creates and populates the request form 230 successfully, at Step 3, the iFrame 220 submits the request form 230 to the proxy B 260 in the server 250.

Figure 3:
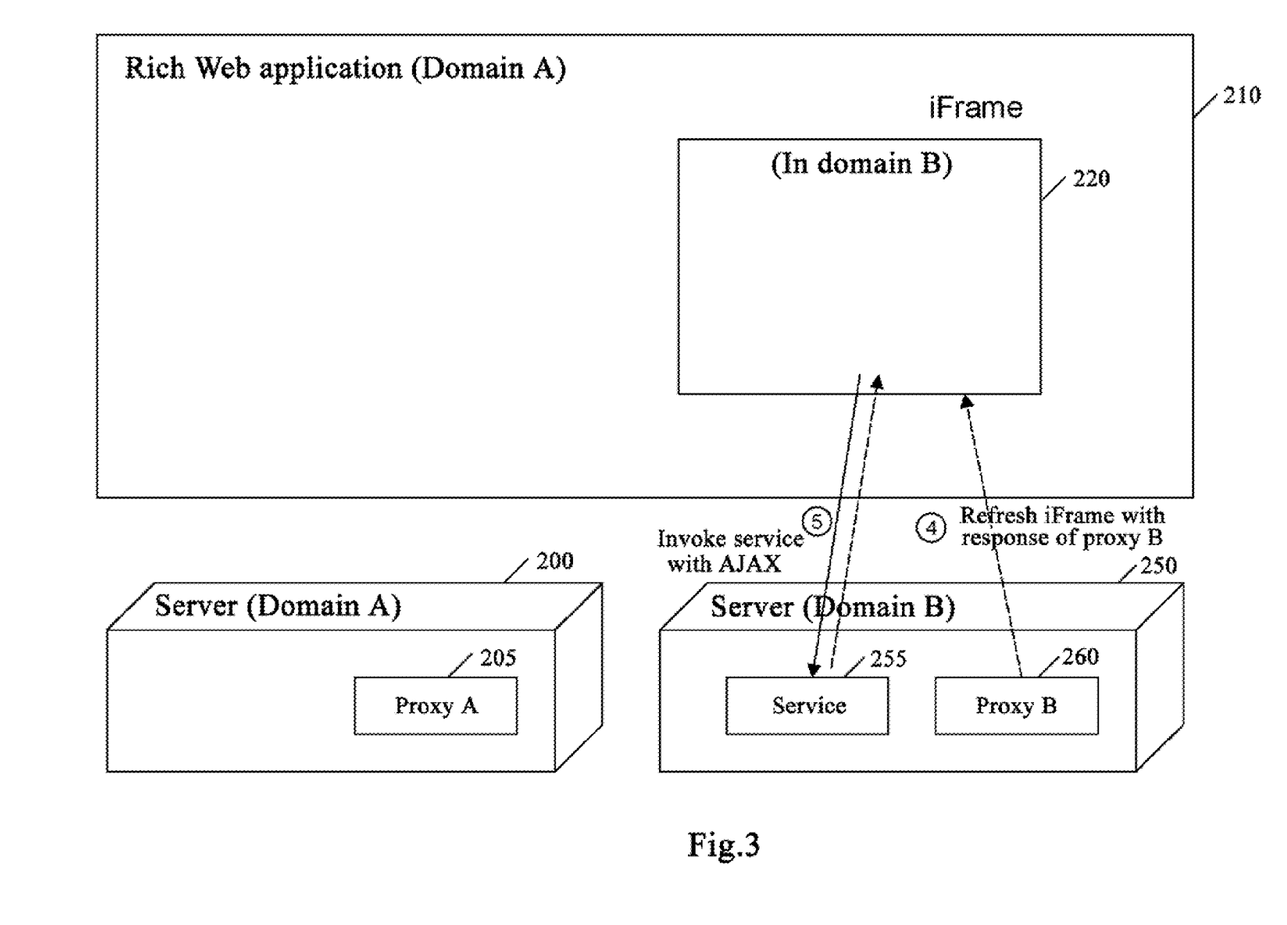
FIG. 3 illustrates an exemplary diagram of a system for cross domain interaction of a Web application and its working flow according to one embodiment of the present invention, which is a continued description of FIG. 2.

Continuing to refer to FIG. 3, FIG. 3 illustrates an exemplary diagram of a system for cross domain interaction of a Web application and its working flow according to one embodiment of the present invention, which is a continued description of FIG. 2. As shown in FIG. 3, the system comprises the server 200 belonging to domain A and the server 250 belonging to domain B, wherein the components comprised in the server 200 and the server 250 are the same as FIG. 2. The rich Web application 210 belonging to the domain A is running on the client browser. At Step 4, after the proxy B 260 of the server 250 receives the request form 230, the proxy 260 will utilize the request data for interaction contained in the request form 230, comprehend the context therein, generate a response for the request form 230 to be returned to the iFrame 220, and refresh the iFrame 220 with the response. At this point, the iFrame 220 is refreshed with the response of the proxy B 260, and the domain to which the iFrame 220 is belonging is changed from the original domain A to the domain B. At Step 5, based on the request data for interaction, the service 255 is invoked with AJAX through the iFrame 220. Since at the moment the iFrame 220 and the service 255 are belonging to the same domain B, the invocation can be performed. It is noted that, in an alternative embodiment of the invention, the iFrame 220 can access the data in the domain B, instead of invoking the service in the domain B. The two implementations are substantially the same, so that it is not described repeatedly.

Figure 4:
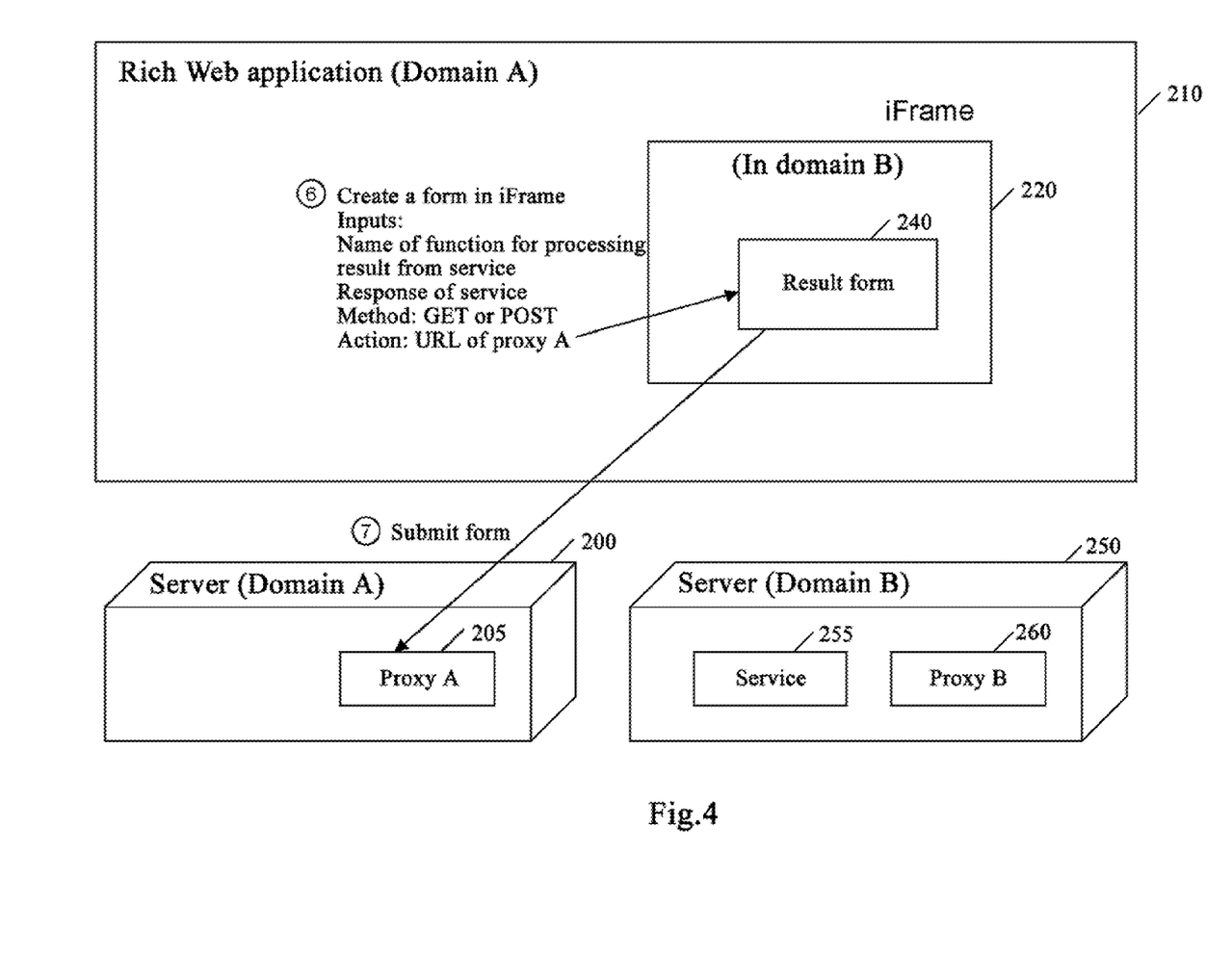
FIG. 4 illustrates an exemplary diagram of a system for cross domain interaction of a Web application and its working flow according to one embodiment of the present invention, which is a continued description of FIG. 3.

Continuing to refer to FIG. 4, FIG. 4 illustrates an exemplary diagram of a system for cross domain interaction of a Web application and its working flow according to one embodiment of the present invention, which is a continued description of FIG. 3. As shown in FIG. 4, the system comprises the server 200 belonging to domain A and the server 250 belonging to domain B, wherein the components comprised in the server 200 and the server 250 are the same as FIG. 2. The rich Web application 210 belonging to the domain A is running on the client browser. At Step 6, based on the result from the invocation to the service 255, the proxy B 260 creates a result form 240 in the iFrame 220. The proxy B 260 populates the created result form 240 with the result data for interaction. The inputs of the result form 240 may comprise: name of the function for processing the result from the service 255, and response of the service 255. The methods of the result form 240 may comprise GET or POST. The actions of the result form 240 may comprise: URL of the proxy A 205. After the result form 240 is created and populated successfully in the iFrame 220, at Step 7, the iFrame 220 submits the result form 240 to the proxy A 205 in the server 200.

Figure 5:
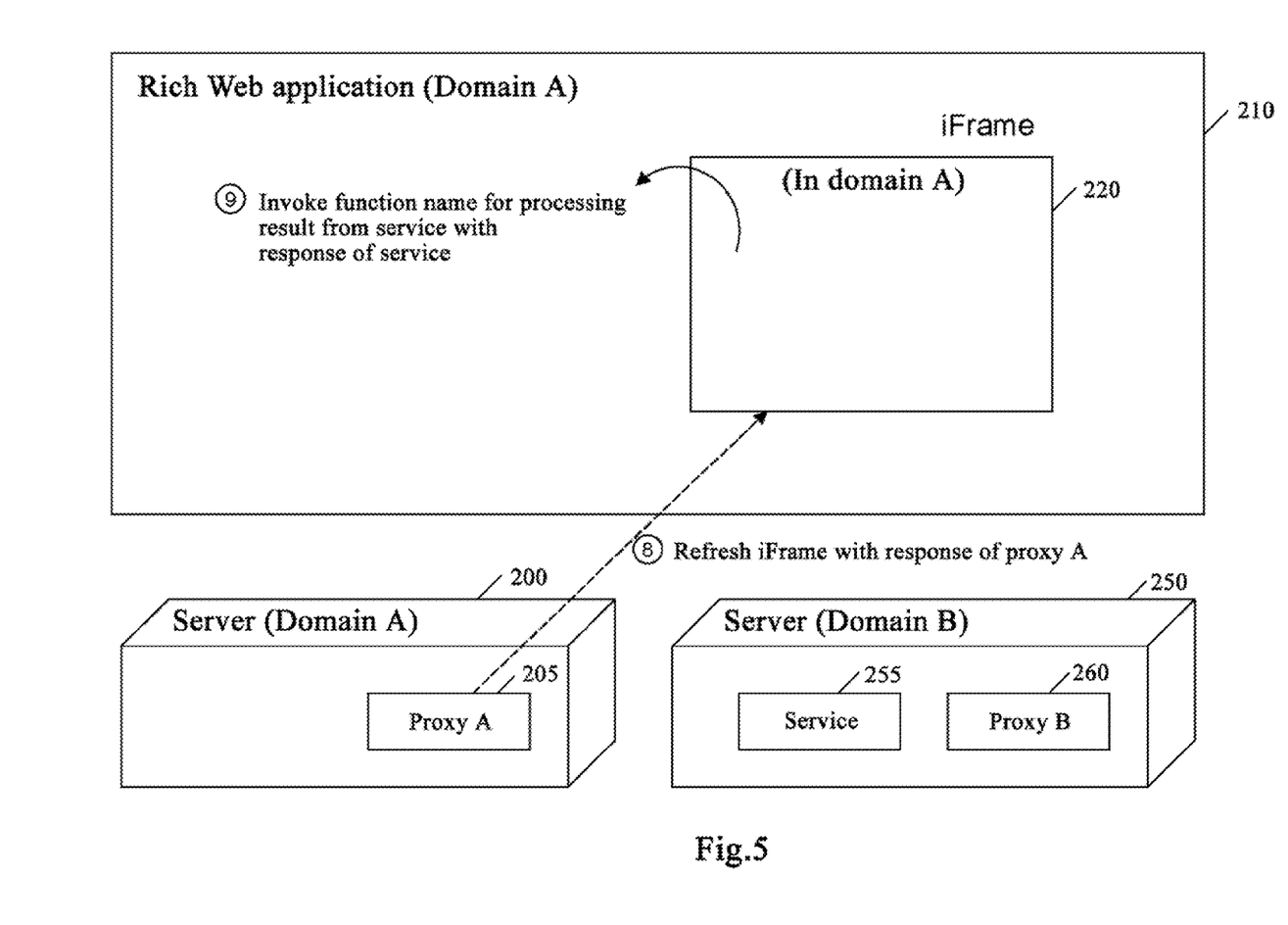
FIG. 5 illustrates an exemplary diagram of a system for cross domain interaction of a Web application and its working flow according to one embodiment of the present invention, which is a continued description of FIG. 4.

Continuing to refer to FIG. 5, FIG. 5 illustrates an exemplary diagram of a system for cross domain interaction of a Web application and its working flow according to one embodiment of the present invention, which is a continued description of FIG. 4. As shown in FIG. 5, the system comprises the server 200 belonging to domain A and the server 250 belonging to domain B, wherein the components comprised in the server 200 and the server 250 are the same as FIG. 2. The rich Web application 210 belonging to the domain A is running on the client browser. At Step 8, after the proxy A 205 in the server 200 receives the result form 240, the proxy A 205 will utilize the result data for interaction contained in the result form 240, comprehend the context therein, generate a response for the result form 240 to be returned to the iFrame 220, and refresh the iFrame 220 with the response. At this point, the iFrame 220 is refreshed with the response of the proxy A 205, and the domain to which the iFrame 220 is belonging is changed from the domain B to the original domain A. At Step 9, through the page in the iFrame 220, the function name for processing the result from the service 255 is invoked with the response of the service 255 contained in the result form 240, wherein the function is for saving or processing the returned result. The iFrame 220 may pass the data in the result form 240 to the rich Web application 210. Since at the moment the iFrame 220, the proxy A 205 and the rich Web application 210 are belonging to the same domain A, the invocation and the data passing can be performed.

The detailed descriptions of the system for cross domain interaction of a Web application and its working flow according to one embodiment of the present invention are presented above. They will be further described by referencing an example so that the skilled in the art can fully understand the the present invention. In the following example, one embodiment of the invention is described with respect to a typical checkout process of an e-commerce website.

Figure 6:
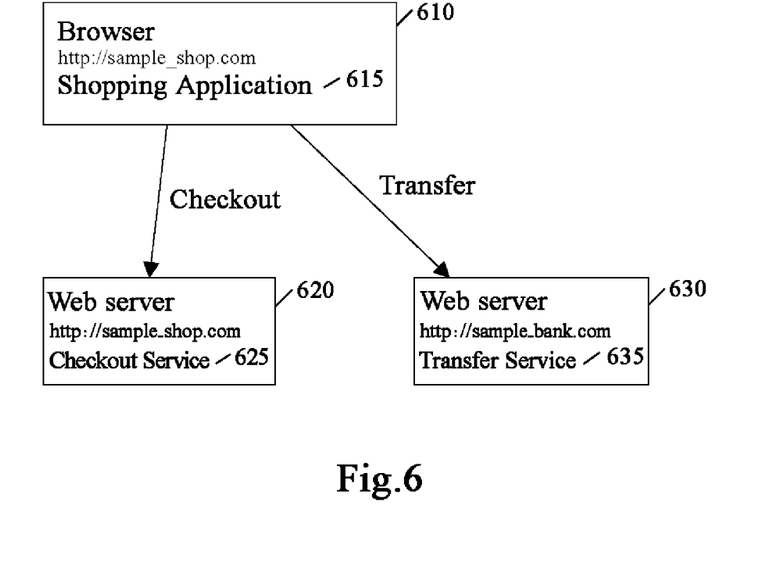
FIG. 6 is an exemplary environment of a typical checkout process of an e-commerce website according to one embodiment of the present invention.

First referring to FIG. 6, FIG. 6 is an exemplary environment of a typical checkout process of an e-commerce website according to one embodiment of the present invention. As shown in FIG. 6, a page of a shopping website "http://sample_shop.com" is displayed on a client browser 610. The page provides a group of services, such as inventory query, price query, item picture presentation, shopping cart, etc. When a user finishes his purchasing activity and wants to check out, the user chooses to use the "Checkout Service" 625. The service is running on a Web server 620 belonging to the same domain and needs the following parameters: payment amount, payee account, and payment serial number. It is obviously that the Checkout Service 625 must complete the payment through a certain bank website chose by the user. Assume that a bank website "http://sample_bank.com" running on a Web server 630 can provide the user with the "Transfer Service" 635. The service needs to receive the following parameters: payment amount, payee account, payer account, and payment serial number, and transfers a specific amount of money (which equals to the payment amount) from the payer account to the payee account after receiving the parameters. The payment serial number is recorded for checking by the payer and the payee. The browser 610 runs a "Shopping Application" 615 that is hosted by "http://sample_shop.com". The application wants to utilize the "Checkout Service" 625 from "http://sample_shop.com" and the "Transfer Service" 635 from "http://sample_bank.com" in order to implement the end-to-end checkout process.

It can be seen from the above example that the "Shopping Application" 615 needs to interact with the services from two different domains. Since the "Shopping Application" 615 itself is belonging to "http://sample_shop.com", it can invoke the "Checkout Service" 625 using the object XmlHttpRequest. However, since the "Transfer Service" 635 is hosted by another different domain "http://sample_bank.com", the object XmlHttpRequest is prevented from invoking the "Transfer Service" 635.

Figure 7:
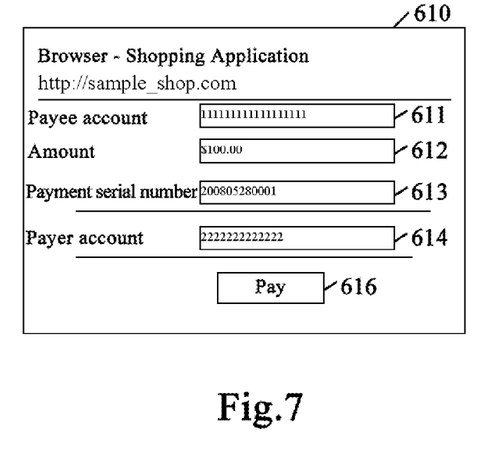
FIG. 7 illustrates an example of a form created in a page displayed on a browser according to one embodiment of the invention.

According to one embodiment of the present invention, the cross domain interaction of a Web application can be completed by an iFrame created in a page and based on form submission. First referring to FIG. 7, FIG. 7 illustrates an example of a form created in a page displayed on a browser. A form is created in a page displayed on a browser 610 belonging to the domain "http://sample_shop.com". The form comprises: payee account 611, payment amount 612, payment serial number 613, and payer account 614. In the form, the values in the payee account 611, payment amount 612, payment serial number 613 can be automatically populated by the "Checkout Service" 625 from the domain "http://sample_shop.com", and the payer account 614 may be filled by the user directly inputting his/her account number on the page. After the above values are determined to be correct, the user may click a "Pay" button 616. Then the "Shopping Application" 615 starts to invoke the "Transfer Service" 635 in the domain "http://sample_bank.com".

Figure 8:
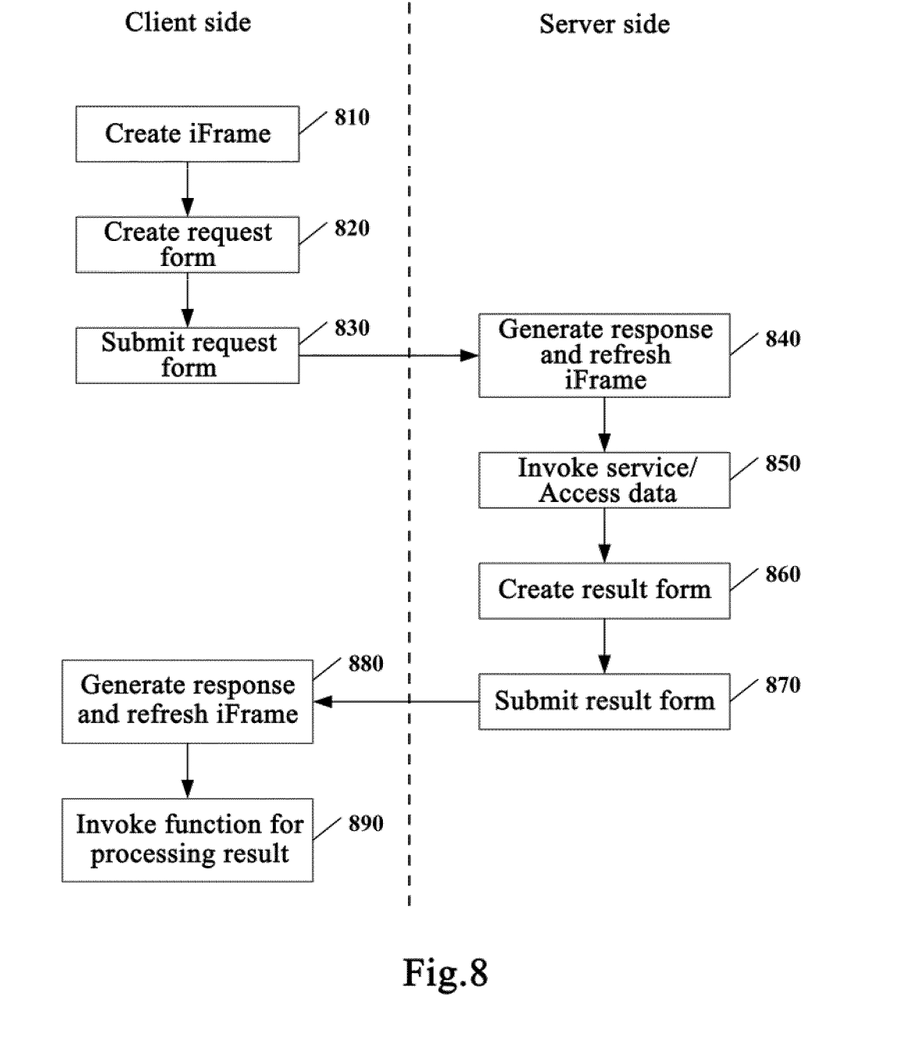
FIG. 8 is an exemplary flowchart of a method for cross domain interaction of a Web application according to one embodiment of the present invention.

The detailed steps for invoking the "Transfer Service" 635 in the domain "http://sample_bank.com" and the exemplary codes for implementing these steps are described hereinbelow with reference to FIG. 8. FIG. 8 is an exemplary flowchart of a method for cross domain interaction of a Web application according to one embodiment of the present invention.

Initially, please refer to the following codes for processing the clicking on the "Pay" button 616:

```
<html>
<script src="http://sample_shop.com/crossdomain.js "></script>
<script>
function pay( ){
    var xhr = new
        CrossDomainXMLHttpRequest("http://sample_bank.com/proxy");
request.open("POST", "http://sample_bank.com/transfer_service", true);
request.onreadystatechange = function( ){
    if (xhr.readyState == 4) {
        if (xhr.status == 200 ) {
            var response = request.responseText;
            ....
        } else if (request.status == 404) {
            ...
        }
    }
}
request.send(document.getElementById("payeeAccount")
    + ";" + document.getElementById("payerAccount")
    + ";" + document.getElementById("amount")
    + " ; " + document.getElementById(" serialNumber " ));   //the
request   data is 1111111111111111111; 2222222222222;
$100.00; 200805280001
}
</script>
<input id= "payeeAccount"></input>
<input id= "amount"></input>
<input id= "serialNumber"></input>
<input id= "payerAccount"></input>
<button id= "pay" onclick= "pay( ); ">Pay</button>
</html>
```

During runtime, when the method "request.send" is invoked, the object CrossDomainXMLHttpRequest will create an invisible iFrame (Step 810 in FIG. 8: create iFrame). The current domain of the iFrame is "http://sample_shop.com". The codes for creating an iFrame are shown as below:

```
<iframe>
</iframe>
```

Then, the object CrossDomainXMLHttpRequest creates a request form in the iFrame and encodes the request data and other related information into the form (Step 820 in FIG. 8: create request form). The codes for creating a request form are shown as below:

```
<iframe>
<form action= "http://sample_bank.com/proxy"
method= "POST"> <!--or method= "GET"-->
<input name= "serviceToCall">http://sample_bank.com/
transfer_service</input>
<input name= "httpMethodOfServiceToCall">POST</input>
<input name= "callbackProxy">http://sample_shop.com/proxy</input>
<input name= "requestData">1111111111111111;
2222222222222;    $100.00; 200805280001</input>
</form>
</iframe>
```

After the request form is created successfully, the object CrossDomainXMLHttpRequest submits the above request form (Step 830 in FIG. 8: submit request form). Because the form has the attribute action="http://sample_bank.com/proxy", the form is submitted to a proxy belonging to the domain "http://sample_bank.com". The proxy will utilize the data contained in the request form to generate a response, and refresh the iFrame with the response (Step 840 in FIG. 8: generate response and refresh iFrame). Now the iFrame is refreshed with the response of the proxy, and the page displayed in the iFrame is switched to the domain "http://sample_bank.com". Then, with the iFrame, the "Transfer service" of the domain "http://sample_bank.com", to which the iFrame is currently belonging, is invoked (Step 850 in FIG. 8: invoke service/access data). In an alternative embodiment of the present invention, the iFrame may access data in the domain "http://sample_bank.com" without invoking services, or both invoke services and accessing data.

After the "Transfer Service" is invoked successfully, based on the invocation result for the "Transfer Service", a new result form is created in the same iFrame (Step 860 in FIG. 8: create result form). The corresponding codes are shown as below:

```
<iframe>
<script>
var xhr = new XMLHttpRequest( );
request.open("POST", "http://sample_bank/transfer_service", true);
request.onreadystatechange = function( ){
if (xhr.readyState == 4) {
    if (xhr.status == 200 ) {
        var response = request.responseText;
        // create a result form in the iFrame
    } else if (request.status == 404) {
        ...
    }
}
request.send("1111111111111111; 2222222222222; $100.00;
200805280001");
}
</script>
<form target= " http://sample_shop.com/proxy">
<input name= "result">you money transferred successfully </input>
</form>
</iframe>
```

After the result form is created successfully, the result form is submitted (Step 870 in FIG. 8: submit result form). Since the result form has the attribute target="http://sample_shop.com/proxy", the form is submitted to a proxy belonging to the domain "http://sample_shop.com". The proxy will utilize the data contained in the result form to generate a response for the result form, and refresh the iFrame with the response. At this point, the iFrame is refreshed with the response of the proxy, and the page displayed in the iFrame is switched back to the original domain "http://sample_shop.com" (Step 880 in FIG. 8: generate response and refresh iFrame). Then the creator of the iFrame (in this example, the object CrossDomainXMLHttpRequest) is notified, and the method "onreadystatechange" in Step 810 is invoked so as to process the result in the result form (Step 890 in FIG. 8: invoke function for processing result). For example, the iFrame may pass the data in the result form to the "Shopping Application" 615.

It is noted that the above example is only for exemplarily demonstrating the embodiments of the invention, and should not be construed as the limitation or exhaustion for the invention. In different contexts, based on the requirements of users or environment, the steps and codes may be altered without departing from the scope of the invention.

With respect to the detailed descriptions of the embodiments of the present invention and in conjunction with the above example, it can be seen that the invention can efficiently realize the cross domain interaction of a Web application, thereby improving the performance of an AJAX-based rich Web application. Furthermore, the invention can intelligently handle data with different sizes. For example, an embodiment of the invention can automatically choose GET or POST according to the size of data amount. When the amount of the request/result data in a form is small, for example less than the URL length restriction, GET may be utilized for submitting the form, thereby optimizing the performance of data transmission. Moreover, the browser can also use a cache to further optimize the operating performance of GET. When the amount of the request/result data in a form is large, for example more than the URL length restriction, POST may be utilized for submitting the form, thereby transmitting the data as a request package without restricting the size of data.

Furthermore, the scheme of an embodiment of the invention has sufficient security. On the one hand, user credentials (e.g. usernames and passwords) of the domain where the Web application used by a user locates are kept locally, and will not be passed to the server side providing services/data belonging to the target domain (i.e. the domain where the service to be invoked or the data to be access locate), thereby ensuring the security of local critical data. On the other hand, if the target domain requires authentication, the browser will pop up an authentication window automatically, for users inputting therein the user credentials (e.g. usernames and passwords) required by the target domain. Such information will not be revealed to the local domain where the Web application locates.

It is noted that, although the description of the invention is based on a rich Web application, the invention can be equivalently applied to a traditional Web application. It is also noted that, although the embodiments of the invention are described with respect to client/server architecture, the invention can be equivalently applied to the Web application interaction between any two machines belonging to two different domains or two Web servers just logically independent, and other similar implementations that will be readily occurred by the skilled in the art.

Figure 9:
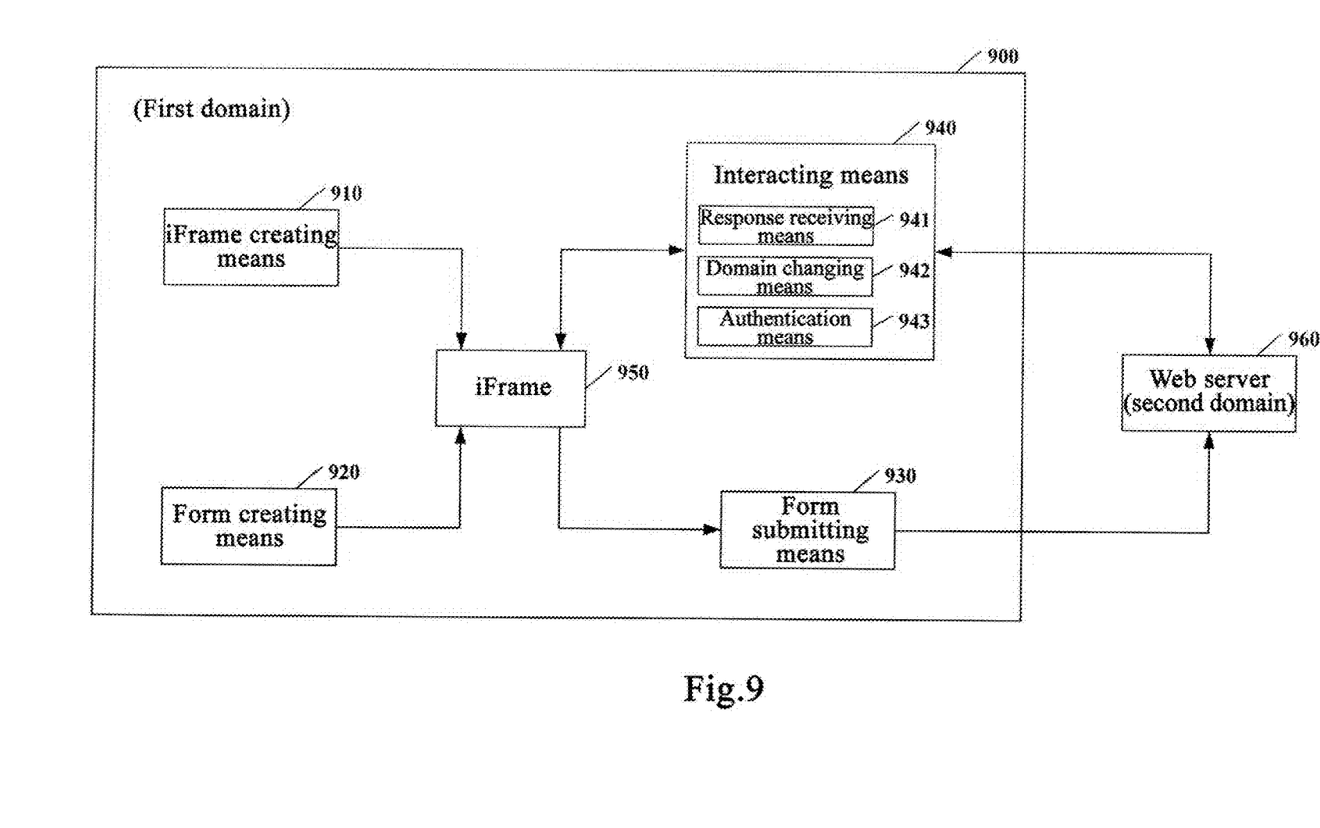
FIG. 9 is an illustrative block diagram showing a system for cross domain interaction of a Web application according to one embodiment of the present invention.

Under the same inventive concept, a system 900 for cross domain interaction of a Web application according to one embodiment of the present invention is further proposed with reference to FIG. 9. In the system, a Web application belonging to a first domain needs to interact with a service belonging to a second domain. As shown in FIG. 9, the systems 900 comprises: an iFrame creating means 910, a form creating means 920, a form submitting means 930, and an interacting means 940. The iFrame creating means 910 is configured for creating an iFrame 950 in a webpage, wherein the iFrame 950 is belonging to the first domain. The form creating means 920 is configured for creating a form in the iFrame 950. The form submitting means 930 is configured for submitting the created form to a Web server 960 providing a service belonging to the second domain. The interacting means 940 further comprises a response receiving means 941, a domain changing means 942, and an authentication means 943. The response receiving means 941 is configured for refreshing the iFrame 950 by receiving a response from the Web server 960. The domain changing means 942 is configured for changing the domain, to which the iFrame 950 is belonging, to the second domain, and performing cross domain interaction with the service belonging to the second domain with the information contained in the form. The authentication means 943 is configured for locally keeping user credentials for the first domain in the Web server providing a service belonging to the first domain so as not to reveal the user credentials. Furthermore, the Web application may be a rich Web application, and the iFrame 950 may be invisible in the webpage.

Further, the system 900 may further comprise: means for creating a result form in the iFrame based on the result from interacting with the service; means for submitting the result form to the Web server providing the service belonging to the first domain; means for refreshing the iFrame by receiving a response from the Web server providing the service belonging to the first domain, and changing the domain, to which the iFrame is belonging, to the first domain; and means for processing the result in the result form.

Further, the form submitting means 930 may further comprise: means for determining whether the method GET or POST is utilized to submit the form according to the size of data amount in the form, wherein when the data amount in the form is small, the method GET may be utilized, and when the data amount in the form is large, the method POST may be utilized.

Further, the means for submitting the result form further comprises: means for determining whether the method GET or POST is utilized to submit the result form according to the size of data amount in the result form, wherein when the data amount in the result form is small, the method GET may be utilized, and when the data amount in the result form is large, the method POST may be utilized.

Further, the system further comprises: means for dynamically popping up an authenticating window by the Web application if the Web server providing the service belonging to the second domain requires authentication, wherein the authenticating window is configured for a user to input therein user credentials for the second domain.

The method and system for cross domain interaction of a Web application according to one embodiment of the present invention are described in detail hereinabove. It can be appreciated that each block in the flow chart or block chart and the combination of some blocks may be implemented by some computer program instructions. These computer program instructions may be provided to a general purpose computer, a specific purpose computer, or a processor of other programmable data processing device, to produce a machine, in which these instructions, when executed by the computers or the processor of other programmable data processing device, can create the means for implementing the functions indicated by the blocks of the block chart and/or the flow chart.

Although the present invention has been presented and described specifically by reference to the preferred embodiments, it is not intended to be exhaustive or limited the invention in the form disclosed. Many modifications on forms and details will be apparent to those ordinary skills in the art without deviating from the scope of the invention. The embodiments were chosen and described in order to best explain the principles of the invention, the practical application, and to enable others of ordinary skill in the art to understand the invention for various embodiments with various modifications as are suited to the particular use contemplated.

What is claimed is:

1. A computer implemented method for cross domain interaction of a Web application, wherein a Web application belonging to a first domain needs to interact with a service belonging to a second domain, the method comprising:
   creating an iFrame in a webpage, wherein the iFrame belongs to the first domain;
   creating a request form in the iFrame, wherein the request form comprises a service request input;
   submitting the request form to a Web server providing a service belonging to the second domain, wherein the iFrame is stored on a computer that is different from the Web server;
   receiving a response from the Web server, the response being in response to the submitting of the request form, wherein the response from the Web server refreshes the iFrame, wherein the response from the Web server changes the domain, to which the iFrame belongs, to the second domain;
   performing cross domain interaction with the service belonging to the second domain with information contained in the request form:
   creating a result form in the iFrame based on the result from interacting with the service, and submitting the result form to a Web server providing a service belonging to the first domain;
   refreshing the iFrame by receiving a response from the Web server providing the service belonging to the first domain, and changing the domain, to which the iFrame belongs, to the first domain, and processing the result in the result form; and
   locally keeping user credentials for the first domain in the Web server providing the service belonging to the first domain.

2. The method according to claim 1, wherein the step of submitting the request form further comprises:
   determining whether the method GET or POST is utilized to submit the request form according to the size of data amount in the request form, wherein when the data amount in the request form is small, the method GET is utilized, and when the data amount in the request form is large, the method POST is utilized.

3. The method according to claim 1, wherein the step of submitting the result form further comprises:
   determining whether the method GET or POST is utilized to submit the result form according to the size of data amount in the result form, wherein when the data amount in the result form is small, the method GET is utilized, and when the data amount in the result form is large, the method POST is utilized.

4. The method according to claim 1, wherein the Web application is a rich Web application.

5. The method according to claim 1, wherein the iFrame is invisible in the webpage.

6. The method according to claim 1, further comprising:
dynamically popping up an authenticating window by the Web application if the Web server providing the service belonging to the second domain requires authentication, wherein the authenticating window is configured for a user to input therein user credentials for the second domain.

7. The method according to claim 1, wherein the request form further comprises:
a name of a function for processing a result from interacting with the service belonging to the second domain;
a URL of a proxy belonging to the first domain;
a URL of the service belonging to the second domain;
an HTTP verb for invoking the service belonging to the second domain;
data for invoking the service belonging to the second domain;
a method comprising at least one of GET or POST; and
an action comprising the URL of the service belonging to the second domain.

8. The method according to claim 1, wherein the result form further comprises:
a name of a function for processing the result from interacting with the service; a URL of a proxy belonging to the first domain; the result from interacting with the service; a method comprising at least one of GET or POST; and an action comprising the URL of the proxy belonging to the first domain.

9. A system for cross domain interaction of a Web application, wherein a Web application belonging to a first domain needs to interact with a service belonging to a second domain, the system comprising:
a processor within a computer that functions to execute:
logic to create an iFrame in a webpage, wherein the iFrame belongs to the first domain;
logic to create a request form in the iFrame, wherein the request form comprises a service request input;
logic to submit the request form to a Web server providing a service belonging to the second domain, wherein the iFrame is stored on a computer that is different from the Web server; and
logic to:
receive a response from the Web server, the response being in response to the submitting of the request form, wherein the response from the Web server refreshes the iFrame, wherein the response from the Web server changes the domain, to which the iFrame belongs, to the second domain;
perform cross domain interaction with the service belonging to the second domain with information contained in the request form;
create a result form in the iFrame based on the result from interacting with the service;
submit the result form to a Web server providing a service belonging to the first domain;
refresh the iFrame by receiving a response from the Web server providing the service belonging to the first domain, and changing the domain, to which the iFrame belongs, to the first domain;
process the result in the result form; and
locally keep user credentials for the first domain in the web server providing the service belonging to the first domain.

10. A computer program product for cross domain interaction of a Web application, wherein a Web application belonging to a first domain needs to interact with a service belonging to a second domain, the computer program product comprising:
a computer-readable storage device to store computer program instructions which, when executed by a processor within a computer, cause the computer to perform operations, the operations comprising:
creating an iFrame in a webpage, wherein the iFrame belongs to the first domain;
creating a request form in the iFrame, wherein the request form comprises a service request input;
submitting the request form to a Web server providing a service belonging to the second domain, wherein the iFrame is stored on a computer that is different from the Web server;
receiving a response from the Web server, the response being a response to the submitting of the request form, wherein the response from the Web server refreshes the iFrame, wherein the response from the Web server changes the domain, to which the iFrame belongs, to the second domain; and
performing cross domain interaction with the service belonging to the second domain with information contained in the request form;
creating a result form in the iFrame based on the result from interacting with the service;
submitting the result form to a Web server providing a service belonging to the first domain;
refreshing the iFrame by receiving a response from the Web server providing the service belonging to the first domain, and the domain, to which the iFrame belongs, to the first domain;
processing the result in the result form; and
locally keeping user credentials for the first domain in the Web server providing the service belonging to the first domain.

11. The computer program product of claim 10, wherein the step of submitting the request form further comprises:
determining whether the method GET or POST is utilized to submit the request form according to the size of data amount in the request form, wherein when the data amount in the request form is small, the method GET is utilized, and when the data amount in the request form is large, the method POST is utilized.

12. The computer program product of claim 10, wherein the step of submitting the result form further comprises:
determining whether the method GET or POST is utilized to submit the result form according to the size of data amount in the result form, wherein when the data amount in the result form is small, the method GET is utilized, and when the data amount in the result form is large, the method POST is utilized.

13. The computer program product of claim 10, wherein the Web application is a rich Web application.

14. The computer program product of claim 10, wherein the iFrame is invisible in the webpage.

15. The computer program product of claim 10, further comprising:
dynamically popping up an authenticating window by the Web application if the Web server providing the service belonging to the second domain requires authentication, wherein the authenticating window is configured for a user to input therein user credentials for the second domain.

* * * * *